(12) United States Patent
Xie

(10) Patent No.: US 9,967,542 B2
(45) Date of Patent: May 8, 2018

(54) 3D IMAGING SYSTEM AND MOBILE PHONE HAVING SAME

(71) Applicant: SHENZHEN DANSHA TECHNOLOGY CO., LTD., Shenzhen, Guangdong OT (CN)

(72) Inventor: Hongyuan Xie, Hong Kong (HK)

(73) Assignee: Shenzhen Dansha Technology Co., Ltd., Shenzhen, Guangdong (CN)

( * ) Notice: Subject to any disclaimer, the term of this patent is extended or adjusted under 35 U.S.C. 154(b) by 137 days.

(21) Appl. No.: 15/132,518

(22) Filed: Apr. 19, 2016

(65) Prior Publication Data
US 2017/0302906 A1    Oct. 19, 2017

(51) Int. Cl.
*H04N 13/02* (2006.01)
*H04N 5/225* (2006.01)

(52) U.S. Cl.
CPC ....... *H04N 13/0203* (2013.01); *H04N 5/2256* (2013.01)

(58) Field of Classification Search
CPC ............ H04N 13/0203; H04N 5/2256; H04N 13/0275; H04N 13/0018
See application file for complete search history.

(56) References Cited

U.S. PATENT DOCUMENTS

2017/0251192 A1*    8/2017    Bridges .............. H04N 13/0018

* cited by examiner

*Primary Examiner* — Behrooz Senfi
(74) *Attorney, Agent, or Firm* — Chun-Ming Shih

(57) ABSTRACT

A 3D imaging system includes: a light source; a modulator connected with the light source and configured to modulate output of the light source with a frequency sweep signal; an optical module connected to the light source; a light sensing device connected with the optical module and configured to sense optical output of the optical module and convert the optical output into a plurality of electrical signals; and a signal processing module connected with the light sensing device and configured to extract 3D information of the object from the electrical signals.

20 Claims, 5 Drawing Sheets

3D IMAGING SYSTEM AND MOBILE PHONE HAVING SAME

FIELD OF THE PATENT APPLICATION

The present patent application generally relates to imaging technologies and more specifically to a 3D imaging system and a mobile phone having the same.

BACKGROUND 3D imaging has been applied to a wide range of areas such as medical imaging, robotics, gesture recognition, face or body scanning for garment fitting, and so on. Compared with 2D imaging, 3D images contain depth information, which is useful for observing artifacts and structures in 3D, detecting structural defects, or evaluating goods without physical presence.

Mobile phones nowadays are usually equipped with high resolution cameras. Currently only 2D images can be taken by these cameras. As the mobile phone is a device that most people find comfortable to carry around, it is therefore desired to have a mobile phone equipped with a 3D imaging system, by which a user can conveniently take high resolution 3D images that contain the depth information.

SUMMARY

The present patent application is directed to a 3D imaging system and a mobile phone having the same. In one aspect, the present patent application provides a 3D imaging system that includes: a light source; a modulator connected with the light source and configured to modulate output of the light source with a frequency sweep signal; an optical module connected to the light source; a light sensing device connected with the optical module and configured to sense optical output of the optical module and convert the optical output into a plurality of electrical signals; and a signal processing module connected with the light sensing device and configured to extract 3D information of the object from the electrical signals. The optical module includes: a first light splitting device connected with the light source and configured to split light from the light source into a light output in a first optical path and a light output in a second optical path, the light output in the first optical path being directed to an object, passing through or being reflected by the object; a second light splitting device connected with the first light splitting device and configured to split the light output in the second optical path into a plurality of optical signals; a light collecting and coupling device configured to collect light passing through or reflected by the object and couple the light to the light combining device; and a light combining device connected with the light collecting and coupling device, the second light splitting device, and the light sensing device, including a plurality of light combiners, and configured to combine optical signals coupled from the light collecting and coupling device and optical signals output by the second light splitting device and output a plurality of combined optical signals.

The light source may be a laser. The laser includes a VCSEL or a VCSEL array. Frequency of the frequency sweep signal may vary with time linearly during each sweep. The first light splitting device may be a fiber optic fusion coupler. The light collecting and coupling device may be a grating coupler that includes a matrix of pixels with m columns and n rows. The second light splitting device may be a light splitter configured to split the light output in the second optical path into k optical signals, k=m×n. The light combining device may include k light combiners, each light combiner being an optical Y-junction configured to combine an optical signal coupled from the light collecting and coupling device and an optical signal output by the second light splitting device and output a combined optical signal. The light sensing device may include a matrix of k pixels, each pixel being a light sensor configured to convert the combined optical signal into an electrical signal.

The system may further include an amplifier placed between the light source and the first light splitting device and configured to amplify optical signal input to the first light splitting device; and a collimator placed between the first light splitting device and the object, and configured to collimate light before the light is directed to the object.

The optical module and the light sensing device may be integrated onto a silicon photonic chip fabricated with SOI processes. The light source, the modulator and the signal processing module may be further integrated onto the silicon photonic chip. The chip may include an optical sub-module. The optical sub-module integrates the light collecting and coupling device and an image sensor.

The optical sub-module may include a matrix of pixels. Each pixel includes a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer. A plurality of teeth are formed in the silicon waveguide layer. A photodiode is disposed on the silicon oxide layer and covered by the glass layer. The refractive indexes of the air, the silicon waveguide layer and the glass layer are n1, n2 and n3 respectively, while n2>n3>n1.

In another aspect, the present patent application provides a mobile phone that includes: a back cover on which a first window and a second window are defined; a light source; a modulator connected with the light source and configured to modulate output of the light source with a frequency sweep signal; a first light splitting device connected with the light source and configured to split light from the light source into a light output in a first optical path and a light output in a second optical path, the light output in the first optical path being directed to an object, passing through or being reflected by the object; a second light splitting device connected with the first light splitting device and configured to split the light output in the second optical path into a plurality of optical signals; an optical sub-module configured to collect light passing through or reflected by the object and couple the light to a light combining device, the light combining device being connected with the optical sub-module and the second light splitting device, comprising a plurality of light combiners, and configured to combine optical signals coupled from the optical sub-module and optical signals output by the second light splitting device and output a plurality of combined optical signals; a light sensing device connected with the light combining device and configured to sense optical output of the light combining device and convert the optical output into a plurality of electrical signals; and a signal processing module connected with the light sensing device and configured to extract 3D information of the object from the electrical signals. The first window is surrounding and aligned with the optical sub-module. The second window is surrounding and aligned with the light output in the first optical path of the first light splitting device.

The second window may be further surrounding and aligned with a flash light. The flash light may be configured to provide assistive lighting for photo or video shooting with the mobile phone.

The optical sub-module may include a matrix of pixels. Each pixel includes a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer. A plurality of teeth are formed in the silicon waveguide layer. A photodiode is disposed on the silicon oxide layer and covered by the glass layer.

In yet another aspect, the present patent application provides a 3D imaging system that includes: a light source being modulated by a frequency sweep signal; a first light splitting device connected with the light source and configured to split light from the light source into a light output in a first optical path and a light output in a second optical path, the light output in the first optical path being directed to an object, passing through or being reflected by the object; a second light splitting device connected with the first light splitting device and configured to split the light output in the second optical path into a plurality of optical signals; an optical sub-module configured to collect light passing through or reflected by the object and couple the light to a light combining device, the light combining device being connected with the optical sub-module and the second light splitting device, including a plurality of light combiners, and configured to combine optical signals coupled from the optical sub-module and optical signals output by the second light splitting device and output a plurality of combined optical signals; a light sensing device connected with the light combining device and configured to sense optical output of the light combining device and convert the optical output into a plurality of electrical signals; and a signal processing module connected with the light sensing device and configured to extract 3D information of the object from the electrical signals. The optical sub-module includes a matrix of pixels with m columns and n rows. Each pixel includes a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer. A plurality of teeth are formed in the silicon waveguide layer. A photodiode is disposed on the silicon oxide layer and covered by the glass layer. The second light splitting device is a light splitter configured to split the light output in the second optical path into k optical signals, k=m×n. The light combining device includes k light combiners. Each light combiner is an optical Y-junction configured to combine an optical signal coupled from the optical sub-module and an optical signal output by the second light splitting device and output a combined optical signal.

The refractive indexes of the air, the silicon waveguide layer and the glass layer may be n1, n2 and n3 respectively, while n2>n3>n1. The light sensing device may include a matrix of k pixels. Each pixel is a light sensor configured to convert the combined optical signal into an electrical signal.

BRIEF DESCRIPTIONS OF THE DRAWINGS

DETAILED DESCRIPTION

Reference will now be made in detail to a preferred embodiment of the 3D imaging system and the mobile phone having the same disclosed in the present patent application, examples of which are also provided in the following description. Exemplary embodiments of the 3D imaging system and the mobile phone having the same disclosed in the present patent application are described in detail, although it will be apparent to those skilled in the relevant art that some features that are not particularly important to an understanding of the 3D imaging system and the mobile phone having the same may not be shown for the sake of clarity.

Furthermore, it should be understood that the 3D imaging system and the mobile phone having the same disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
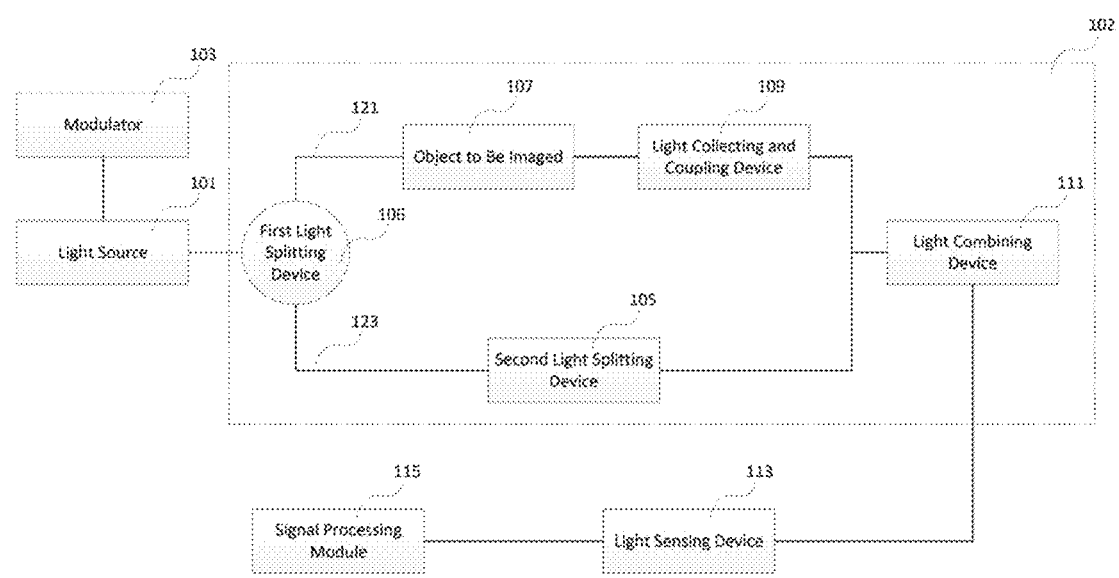
FIG. 1 is a block diagram of a 3D imaging system in accordance with an embodiment of the present patent application.

FIG. 1 is a block diagram of a 3D imaging system in accordance with an embodiment of the present patent application. Referring to FIG. 1, the 3D imaging system includes a light source 101, a modulator 103 connected with the light source 101, an optical module 102 connected to the light source 101, a light sensing device 113 connected with the optical module 102, and a signal processing module 115 connected with the light sensing device 113.

Referring to FIG. 1, the optical module 102 includes a first light splitting device 106 connected with the light source 101, a second light splitting device 105 connected with the first light splitting device 106, a light collecting and coupling device 109, and a light combining device 111 connected with the light collecting and coupling device 109, the second light splitting device 105, and the light sensing device 113.

In this embodiment, the light source 101 is a laser. The laser includes a VCSEL or a VCSEL array. The intensity of the output of the light source 101 is modulated by the modulator 103 with a frequency sweep signal v(t). In this embodiment, the frequency of the signal v(t) varies with time linearly during each sweep. The first light splitting device 106 is a light splitter that is configured to split the modulated light output from the light source 101 into light outputs in two optical paths 121 and 123. As an example, the light splitter may be a fiber optic fusion coupler.

Referring to FIG. 1, the light output of the first light splitting device 106 in the optical path 121 is directed to an object 107 to be imaged, passing through the object if the object 107 is transparent or being reflected by the object 107 if the object 107 is not transparent. In either case, light coming from the object 107 (i.e. light passing through the object 107 or light reflected by the object 107) is collected and coupled to the light combining device 111 by the light collecting and coupling device 109. In this embodiment, the light collecting and coupling device 109 is a grating coupler that includes a matrix of pixels. The matrix has m columns and n rows, wherein m=600, n=800 in this embodiment as an example. So there are m×n=480,000 optical signals being coupled by the light collecting and coupling device 109 to the light combining device 111.

Referring to FIG. 1, the light output of the first light splitting device 106 in the optical path 123 is coupled into the second light splitting device 105. In this embodiment, the second light splitting device 105 is a light splitter that is configured to split the light output into k optical signals, where k=m×n=480,000. The 480,000 optical signals output from the second light splitting device 105 are guided into the light combining device 111 and treated as reference signals.

The light combining device 111 includes m×n=k=480,000 light combiners. Each light combiner, in this embodiment, is an optical Y-junction that is configured to combine an optical signal coupled from the light collecting and coupling device 109 and an optical signal output by the second light splitting device 105 and output the combined optical signal.

The combined optical signal output by each light combiner in the light combining device 111 is guided to a pixel of the light sensing device 113. The light sensing device 113 includes a matrix of pixels, each pixel in the matrix being a light sensor configured to convert the combined optical signal into an electrical signal, for example, a current signal i(t). In this embodiment, the matrix of pixels of the light sensing device 113 includes m×n=k=480,000 pixels. The electrical signals output by the light sensing device 113 are transmitted to the signal processing module 115. The signal processing module 115 is configured to extract 3D information of the object 107 from the electrical signals, which will be described in more detail hereafter.

According to another embodiment of the present patent application, an amplifier is placed between the light source 101 and the first light splitting device 106, and configured to amplify the optical signal input to the first light splitting device 106. The amplifier may be a fiber amplifier as an example. In the optical path 121, a collimator is placed between the first light splitting device 106 and the object 107, and configured to collimate the light before the light is directed to the object 107.

In the above embodiments, the optical module 102, which includes the first light splitting device 106, the second light splitting device 105, the light collecting and coupling device 109, and the light combining device 111, and the light sensing device 113 are integrated onto a silicon photonic chip. Preferably, the silicon photonic chip is fabricated with SOI (silicon-on-insulator) processes.

The method that the signal processing module 115 uses to extract 3D information of the object 107 from the electrical signals output by the light sensing device 113 is illustrated below. Referring to FIG. 1, the time delay difference $T_d$ between optical signals in the optical path 121 and the optical path 123 includes two components: the delay difference in the fiber $T_f$ and the delay difference outside of the fiber $T_O$. The delay difference inside the fiber $T_f$ is a constant over different pixels of the light collecting and coupling device 109. The delay difference outside of the fiber $T_O$ depends on the specific pixel, and is in direct correlation with spatial information of the object 107, which includes the aforementioned depth information.

Consider any two light combiners $C_1$ and $C_2$ of the light combining device 111, which correspond to two pixels of the light collecting and coupling device 109 respectively. The time delay in the optical path 121 for the light combiner $C_1$ is $D_{11}$, and the time delay in the optical path 123 for the light combiner $C_1$ is $D_{12}$; while the time delay in the optical path 121 for the light combiner $C_2$ is $D_{21}$, and the time delay in the optical path 123 for the light combiner $C_2$ is $D_{22}$. The time delay difference between optical signals in the optical path 121 and the optical path 123 for one pixel (corresponding to the light combiner $C_1$) is: $T_{d1}=D_{11}-D_{12}=T_{f1}+T_{O1}$, wherein $T_{f1}$ is the time delay difference inside the fiber for the pixel, and $T_{O1}$ is the time delay difference outside of the fiber for the pixel. The time delay difference between optical signals in the optical path 121 and the optical path 123 for the other pixel (corresponding to the light combiner $C_2$) is: $T_{d2}=D_{21}-D_{22}=T_{f2}+T_{O2}$, wherein $T_{f2}$ is the time delay difference outside of the fiber for the other pixel, and $T_{O2}$ is the time delay difference outside of the fiber for the other pixel.

Because all optical signals in the optical paths 121 and 123 go through the same fiber setup regardless of the specific pixel positions, the time delay differences in the fiber $T_f$ for the two pixels are the same, i.e. $T_{f1}=T_{f2}$. However, if spatially related physical features, such as boundary, refractive index and etc., of the object 107 that correspond to the two pixels are different, the time delay differences outside of the fiber for the two pixels are different, i.e. $T_{O1} \neq T_{O2}$. In other words, $T_{d1}-T_{d2}=T_{O1}-T_{O2}$.

Hence, the variance in the time delay differences $T_d$ between the two optical paths 121 and 123 at different pixels contains the relative 3D spatial information of different pixel locations of the object 107. Such a variance further leads to different optical frequencies of the optical output of different light combiners, which in turn leads to different electrical frequencies of the electrical output of different pixels of the light sensing device 113. By analyzing these different electrical frequencies, the relative 3D spatial information of the object 107 at different pixel locations can be determined and extracted.

Figure 2:
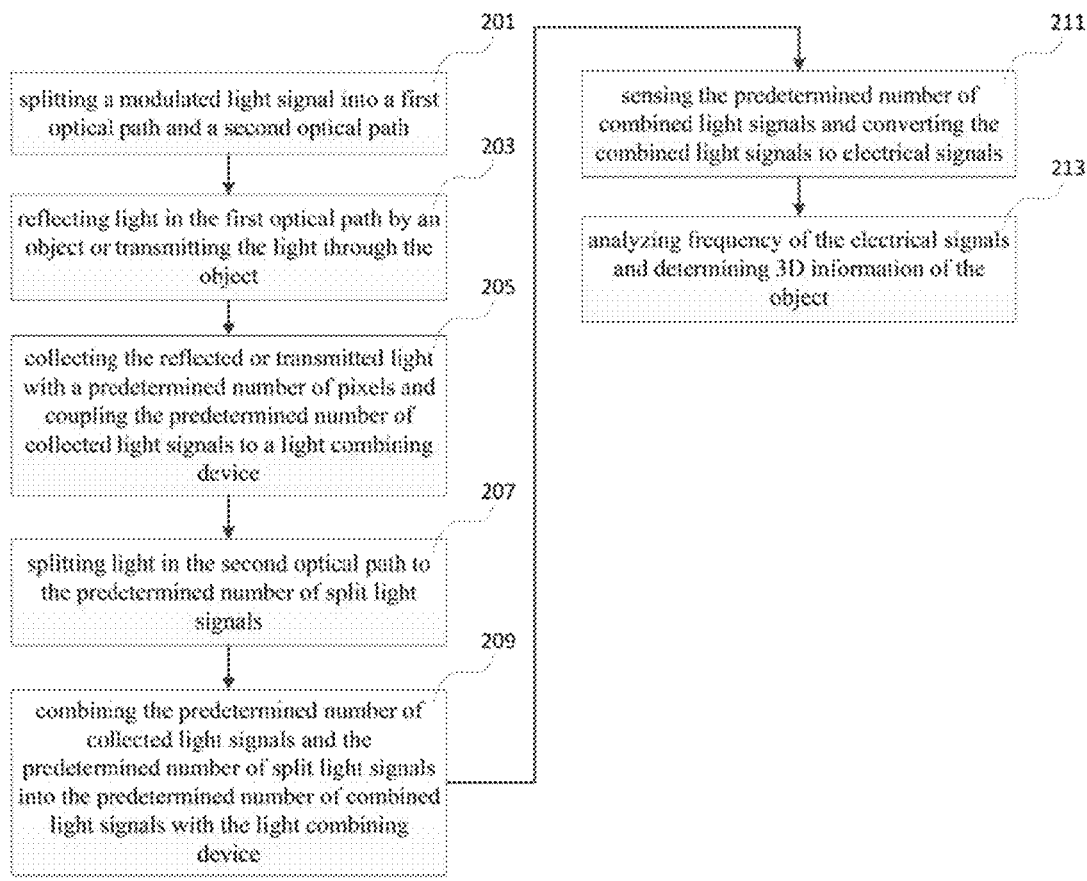
FIG. 2 is a flow chart illustrating a method for extracting 3D information of an object by the 3D imaging system depicted in FIG. 1.

FIG. 2 is a flow chart illustrating a method for extracting 3D information of an object by the 3D imaging system depicted in FIG. 1. Referring to FIG. 2, the method includes: splitting a modulated optical signal into a first optical path and a second optical path (step 201); reflecting light in the first optical path by an object or transmitting the light through the object (step 203); collecting the reflected or transmitted light with a predetermined number of pixels and coupling the predetermined number of collected optical signals to a light combining device (step 205); splitting light in the second optical path to the predetermined number of split optical signals (step 207); combining the predetermined number of collected optical signals and the predetermined number of split optical signals into the predetermined number of combined optical signals with the light combining device (step 209); sensing the predetermined number of combined optical signals and converting the combined optical signals to electrical signals (step 211); and analyzing frequency of the electrical signals and determining 3D information of the object (step 213).

Figure 3A:
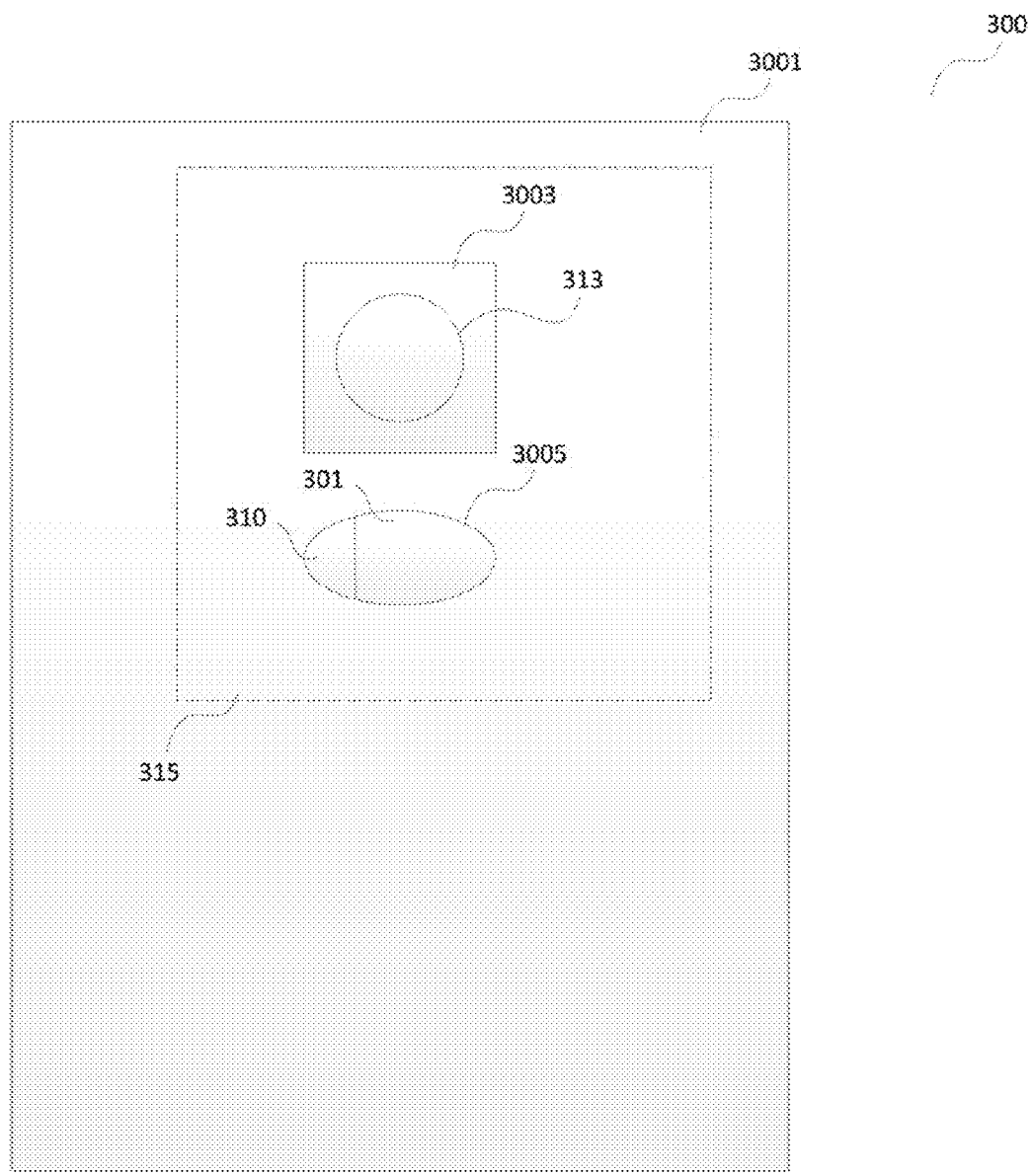
FIG. 3A is a back view of a mobile phone having a 3D imaging system in accordance with another embodiment of the present patent application.

FIG. 3A is a back view of a mobile phone having a 3D imaging system in accordance with another embodiment of the present patent application. Referring to FIG. 3A, a first window 3003 and a second window 3005 are defined in back cover 3001 of the mobile phone 300. The first window 3003 is surrounding and aligned with an optical sub-module 313. In this embodiment, the optical sub-module 313 integrates the light collecting and coupling device 109 and an image sensor. The structure of the optical sub-module 313 will be described in more detail hereafter. The second window 3005 is surrounding and aligned with a flash light 310 and a laser output 301. In this embodiment, the laser output 301 is the output of the first light splitting device 106 (referring to FIG. 1) in the optical path 121. The flash light 310 is optional and configured to provide assistive lighting for photo or video shooting with the mobile phone 300. The 3D imaging system, which includes all the elements in the embodiment illustrated by FIG. 1, is integrated on a silicon photonic chip 315, which is disposed underneath the back cover 3001. Preferably, the silicon photonic chip 315 is fabricated with SOI (silicon-on-insulator) processes.

Figure 3B:
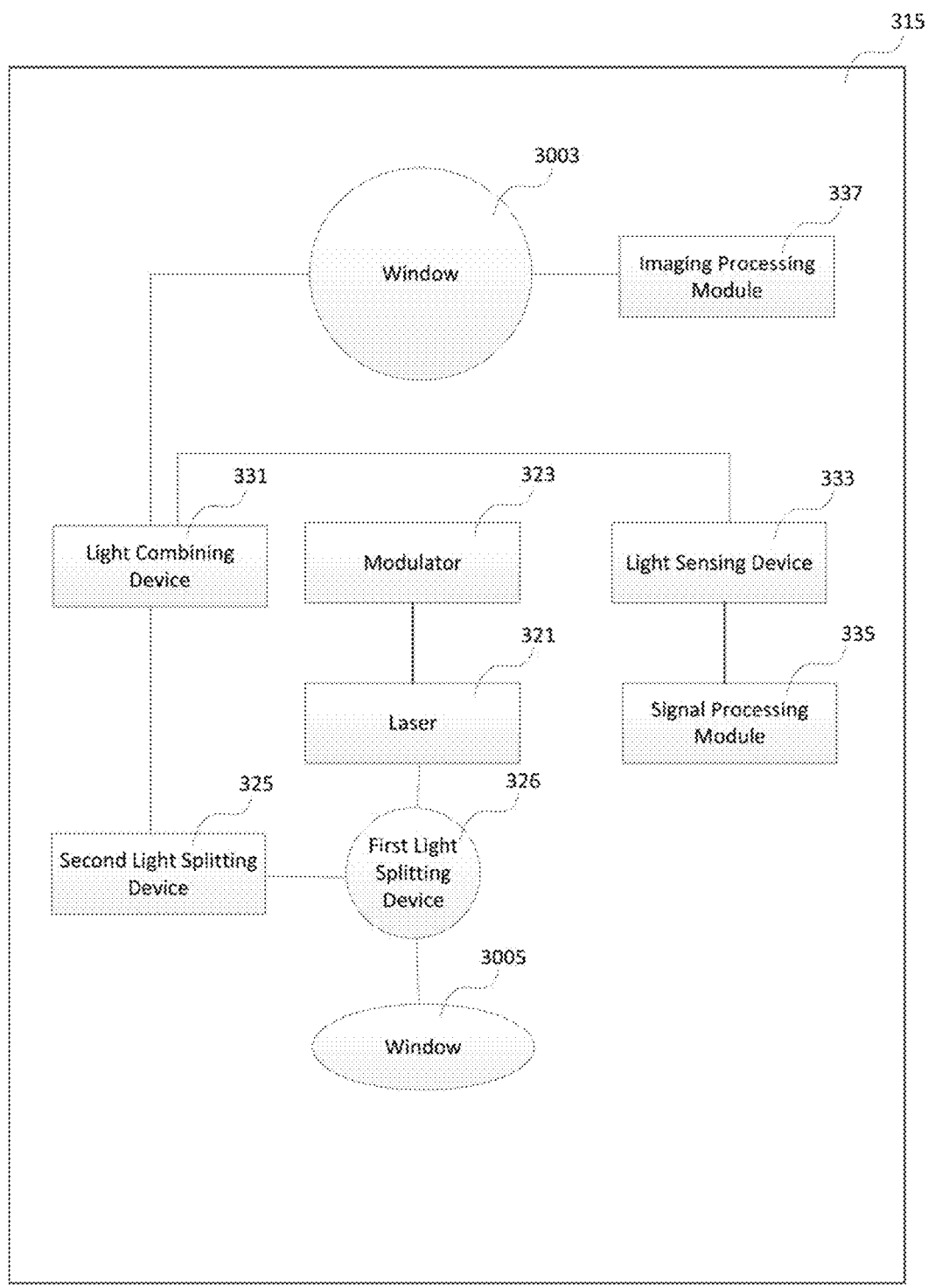
FIG. 3B illustrates a chip layout of the 3D imaging system depicted in FIG. 3A.

FIG. 3B illustrates a chip layout of the 3D imaging system depicted in FIG. 3A. Referring to FIG. 3B, the 3D imaging system is integrated on the silicon photonic chip 315, which includes a laser 321, a modulator 323 connected with the laser 321, and a first light splitting device 326 connected with the laser 321. The first light splitting device 326 is an on chip light splitter with one output being projected out of the window 3005, and the other output being connected with a second light splitting device 325, which is also integrated on the chip 315. The chip 315 further includes an optical sub-module 313, which integrates the light collecting and coupling device 109 and an image sensor. The optical sub-module 313 is aligned with the window 3003. The chip 315 further includes a light combining device 331. Optical signals coupled by the optical sub-module 313 and optical signals output by the second light splitting device 325 are fed to the light combining device 331 and combined by the light combining device 331. A light sensing device 333 and a signal processing module 335 are connected to the light combining device 331 and also integrated on the chip 315. As the optical sub-module 313 integrates the image sensor, the chip 315 may further include an optional image processing module 337 connected to the optical sub-module 313, and configured to process the image captured by the optical sub-module 313.

Figure 4:
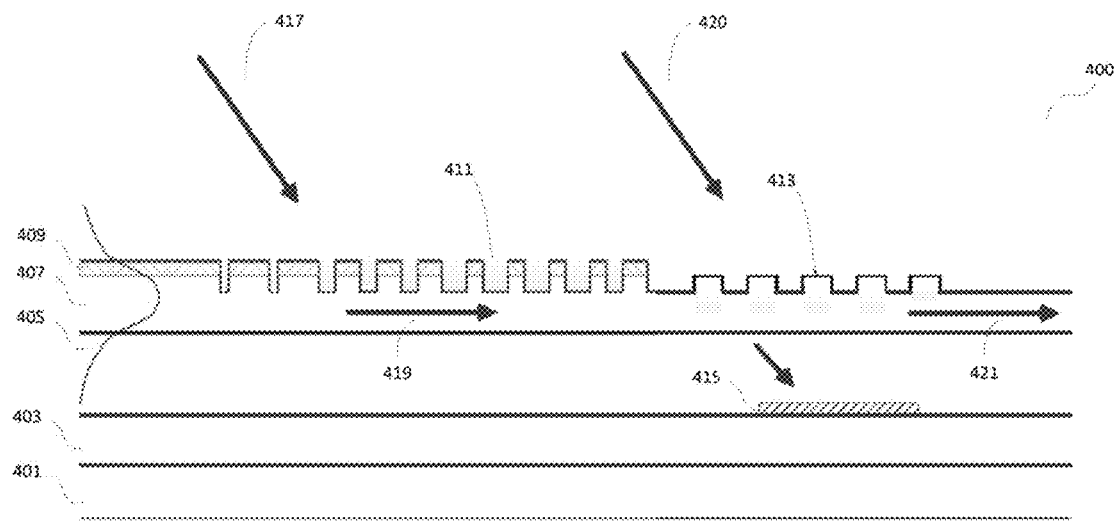
FIG. 4 is a partial cross-sectional view of an optical sub-module of the mobile phone depicted in FIG. 3A.

FIG. 4 is a partial cross-sectional view of an optical sub-module of the mobile phone depicted in FIG. 3A. The optical sub-module 313 includes a matrix of pixels implemented on a silicon photonic chip. The matrix has m columns and n rows, wherein m=600, n=800 in this embodiment as an example. Each pixel includes a multi-layer structure. Referring to FIG. 4, a pixel 400 includes a silicon substrate layer 401, a silicon oxide layer 403 disposed on the silicon substrate layer 401, a glass layer 405 disposed on the silicon oxide layer 403, a silicon waveguide layer 407 disposed on the glass layer 405, and a polysilicon layer 409 partially covering the silicon waveguide layer 407. A plurality of teeth (i.e. gratings) 411 and 413 are formed in the silicon waveguide layer 407. As shown in FIG. 4, a part of the teeth (i.e. teeth 411) are covered by the polysilicon layer 409, while the other part of the teeth (i.e. teeth 413) are not covered by the polysilicon layer 409. A photodiode 415 is disposed on the silicon oxide layer 403 and covered by the glass layer 405.

Suppose the refractive indexes of the air, the silicon waveguide layer 407 and the glass layer 405 are n1, n2 and n3 respectively. In this embodiment, n2>n3>n1. Such a relationship ensures light is guided in a desired path in the optical sub-module 313 as described in detail below.

Referring to FIG. 4, light (illustrated by the arrow 417) incident on the part of the pixel covered by the polysilicon layer 409 passes through the teeth 411 and thereby is coupled into the silicon waveguide layer 407, and transmitting along the silicon waveguide (illustrated by the arrow 419). When the light travels into the area below the teeth 413, a portion of the light is reflected by the teeth 413, entering the glass layer 405, and then collected by the photodiode 415. The remaining portion of the light stays propagating in the silicon waveguide layer 407, as illustrated by the arrow 421, and is guided to the a light combiner of the light combining device 111. It is noted that the light combining device 111 is integrated to the same silicon photonic chip 315 as the optical sub-module 313.

Light (illustrated by the arrow 420) incident on the part of the pixel not covered by the polysilicon layer 409 enters the teeth 413, passes through the silicon waveguide layer 407, enters the glass layer 405, and is collected by the photodiode 415. The light collected by the photodiode 415 of different pixels can be used to form an image of the object 107 so that the optical sub-module 313 integrates not only the light collecting and coupling device 109 but also an image sensor.

In this embodiment, the thickness of the polysilicon layer 409 may be adjusted to achieve the optimal directionality and coupling length of the gratings (i.e. teeth). The length and width variations of the gratings may be adjusted as well.

The 3D imaging system provided by the aforementioned embodiments is fabricated on a single silicon photonic chip and hence can be integrated with a mobile phone with an assembly process that is not complicated nor expensive. In addition, the 3D imaging system integrates the function of an imaging sensor, further reducing the manufacturing cost of the mobile phone having the 3D imaging system and the complexity of its assembly process. Further, the mobile phone having the 3D imaging system has a similar appearance as regular mobile phones and therefore is easy to use and customize according to users' habits of using regular mobile phones.

While the present patent application has been shown and described with particular references to a number of embodiments thereof, it should be noted that various other changes or modifications may be made without departing from the scope of the present invention.

What is claimed is:

1. A 3D imaging system comprising:
   a light source;
   a modulator connected with the light source and configured to modulate output of the light source with a frequency sweep signal;
   an optical module connected to the light source;
   a light sensing device connected with the optical module and configured to sense optical output of the optical module and convert the optical output into a plurality of electrical signals; and
   a signal processing module connected with the light sensing device and configured to extract 3D information of the object from the electrical signals; wherein:
   the optical module comprises:
      a first light splitting device connected with the light source and configured to split light from the light source into a light output in a first optical path and a light output in a second optical path, the light output in the first optical path being directed to an object, passing through or being reflected by the object;
      a second light splitting device connected with the first light splitting device and configured to split the light output in the second optical path into a plurality of optical signals;
      a light collecting and coupling device configured to collect light passing through or reflected by the object and couple the light to the light combining device; and
      a light combining device connected with the light collecting and coupling device, the second light splitting device, and the light sensing device, comprising a plurality of light combiners, and configured to combine optical signals coupled from the light collecting and coupling device and optical signals output by the second light splitting device and output a plurality of combined optical signals.

2. The system of claim 1, wherein the light source is a laser, the laser comprising a VCSEL or a VCSEL array.

3. The system of claim 1, wherein frequency of the frequency sweep signal varies with time linearly during each sweep.

4. The system of claim 1, wherein the first light splitting device is a fiber optic fusion coupler.

5. The system of claim 1, wherein the light collecting and coupling device is a grating coupler that comprises a matrix of pixels with m columns and n rows.

6. The system of claim 5, wherein the second light splitting device is a light splitter configured to split the light output in the second optical path into k optical signals, k=m×n.

7. The system of claim 6, wherein the light combining device comprises k light combiners, each light combiner being an optical Y-junction configured to combine an optical signal coupled from the light collecting and coupling device and an optical signal output by the second light splitting device and output a combined optical signal.

8. The system of claim 7, wherein the light sensing device comprises a matrix of k pixels, each pixel being a light sensor configured to convert the combined optical signal into an electrical signal.

9. The system of claim 1 further comprising an amplifier placed between the light source and the first light splitting device and configured to amplify optical signal input to the first light splitting device; and a collimator placed between the first light splitting device and the object, and configured to collimate light before the light is directed to the object.

10. The system of claim 1, wherein the optical module and the light sensing device are integrated onto a silicon photonic chip fabricated with SOI processes.

11. The system of claim 10, wherein the light source, the modulator and the signal processing module are further integrated onto the silicon photonic chip.

12. The system of claim 11, wherein the chip comprises an optical sub-module, the optical sub-module integrating the light collecting and coupling device and an image sensor.

13. The system of claim 12, wherein the optical sub-module comprises a matrix of pixels, each pixel comprises a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

14. The system of claim 13, wherein the refractive indexes of the air, the silicon waveguide layer and the glass layer are n1, n2 and n3 respectively, while n2>n3>n1.

15. A mobile phone comprising:
a back cover on which a first window and a second window are defined;
a light source;
a modulator connected with the light source and configured to modulate output of the light source with a frequency sweep signal;
a first light splitting device connected with the light source and configured to split light from the light source into a light output in a first optical path and a light output in a second optical path, the light output in the first optical path being directed to an object, passing through or being reflected by the object;
a second light splitting device connected with the first light splitting device and configured to split the light output in the second optical path into a plurality of optical signals;
an optical sub-module configured to collect light passing through or reflected by the object and couple the light to a light combining device, the light combining device being connected with the optical sub-module and the second light splitting device, comprising a plurality of light combiners, and configured to combine optical signals coupled from the optical sub-module and optical signals output by the second light splitting device and output a plurality of combined optical signals;
a light sensing device connected with the light combining device and configured to sense optical output of the light combining device and convert the optical output into a plurality of electrical signals; and
a signal processing module connected with the light sensing device and configured to extract 3D information of the object from the electrical signals; wherein:
the first window is surrounding and aligned with the optical sub-module; and
the second window is surrounding and aligned with the light output in the first optical path of the first light splitting device.

16. The mobile phone of claim 15, wherein the second window is further surrounding and aligned with a flash light, the flash light being configured to provide assistive lighting for photo or video shooting with the mobile phone.

17. The mobile phone of claim 15, wherein the optical sub-module comprises a matrix of pixels, each pixel comprises a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

18. A 3D imaging system comprising:
a light source being modulated by a frequency sweep signal;
a first light splitting device connected with the light source and configured to split light from the light source into a light output in a first optical path and a light output in a second optical path, the light output in the first optical path being directed to an object, passing through or being reflected by the object;
a second light splitting device connected with the first light splitting device and configured to split the light output in the second optical path into a plurality of optical signals;
an optical sub-module configured to collect light passing through or reflected by the object and couple the light to a light combining device, the light combining device being connected with the optical sub-module and the second light splitting device, comprising a plurality of light combiners, and configured to combine optical signals coupled from the optical sub-module and optical signals output by the second light splitting device and output a plurality of combined optical signals;
a light sensing device connected with the light combining device and configured to sense optical output of the light combining device and convert the optical output into a plurality of electrical signals; and a signal processing module connected with the light sensing device and configured to extract 3D information of the object from the electrical signals; wherein:

the optical sub-module comprises a matrix of pixels with m columns and n rows, each pixel comprising a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer;

the second light splitting device is a light splitter configured to split the light output in the second optical path into k optical signals, k=m×n; and the light combining device comprises k light combiners, each light combiner being an optical Y-junction configured to combine an optical signal coupled from the optical sub-module and an optical signal output by the second light splitting device and output a combined optical signal.

19. The system of claim 18, wherein the refractive indexes of the air, the silicon waveguide layer and the glass layer are $n1$, $n2$ and $n3$ respectively, while $n2>n3>n1$.

20. The system of claim 18, wherein the light sensing device comprises a matrix of k pixels, each pixel being a light sensor configured to convert the combined optical signal into an electrical signal.

* * * * *